Patented Mar. 2, 1954

2,671,085

UNITED STATES PATENT OFFICE 2,671,085

2 - TRICHLOROMETHYL - 4,6 - BIS - PARA-CHLOROPHENYL-1,3,5-TRIAZINE

Christoph J. Grundmann and Gerhard Ottmann, Columbus, Ohio, assignors to Mathieson Chemical Corporation, a corporation of Virginia No Drawing. Application December 12, 1952, Serial No. 325,712

1 Claim. (Cl. 260—248)

This invention relates to a new composition of matter, 2 - trichloromethyl - 4,6 - bis - parachlorophenyl-1,3,5-triazine.

The synthesis of the novel composition from readily accessible starting materials may be accomplished as indicated by the following equations:

(1)
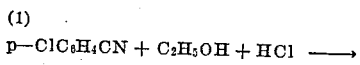
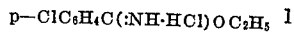

(2)
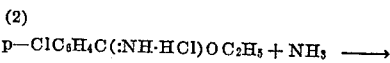
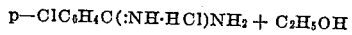

(3)
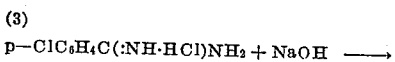
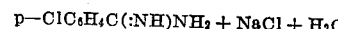

(4)
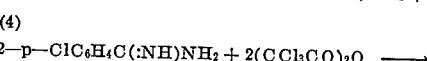
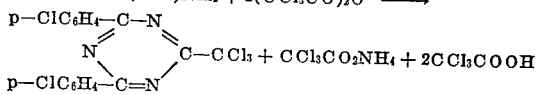

In the reaction indicated by the first equation, the nitrile may be converted to an ester of other low molecular weight alcohols, for example, methanol. Dry hydrogen chloride is passed through the mixture for several hours and it is then allowed to stand for several additional hours or more. Advantageously, a solvent or suspending medium is provided for the reaction such as a low molecular weight ether or a hydrocarbon solvent, for example, ethyl ether or benzene. The ethyl p-chloroiminobenzoate hydrochloride is separated by any suitable means, for example, filtration, washed with additional solvent and dried. Yield of the product may be about 80 per cent or more. Recovery and re-treatment of the unreacted nitrile raises the ultimate yield.

The p-chlorobenzamidine product of the second equation is prepared by the action of ammonia on ethyl p-chloroiminobenzoate hydrochloride, suitably in solution in a lower molecular weight alcohol. After standing for at least several hours, ammonium chloride apparently resulting from side reactions separates and is removed. The crude product is recovered by evaporation of the solvent and may be purified, by neutralization and recrystallization from hot water (Equation 3). The pure p-chlorobenzamidine has a melting point of 155–156° C.

The condensation reaction of Equation 4 to form the novel triazine is a vigorous reaction and provision should be made for the removal of the heat of reaction. The reaction is completed by heating at about 120° C. until the mixture is homogeneous. The product is recovered and recrystallized from alcohol. It has a melting point of 142° C.

The novel triazine may also be prepared by condensing the p-chlorobenzamidine with acetic anhydride and chlorinating the 2-methyl group to the 2-trichloromethyl-4,6-bis-p-chlorophenyl-1,3,5-triazine.

The new compound possesses insecticidal activity and has value in pesticidal formulations.

The following example illustrates preparation of the novel composition.

Ethyl p-chloroiminobenzoate hydrochloride was prepared by passing dry hydrogen chloride through a mixture of 200 grams of p-chlorobenzonitrile, 85 ml. of ethanol and 1 liter of anhydrous benzene until crystallization began. The mixture was then allowed to stand at low temperature for several days. The crystalline product was separated by filtration, washed with anhydrous ether to remove unchanged nitrile and dried in a vacuum over solid sodium hydroxide. 200 grams of product was obtained and a second fraction, amounting to 30 grams, separated from the mother liquor after several days. The total yield was 230 grams, equivalent to 83 per cent of the theoretical amount.

A mixture of 3.3 grams of ammonia in 36.7 grams of absolute ethanol was added in small portions to 42 grams of the ethyl-p-chloroiminobenzoate hydrochloride and the mixture was shaken for 12 hours. After standing for an additional 48 hours, the turbid liquid deposited crystals comprising principally ammonium chloride and these were removed by filtration. The filtrate was evaporated in a vacuum to dryness to obtain crude p-chlorobenzamidine hydrochloride. The crude product was purified by dissolving it in cold water and adding 5 per cent sodium hydroxide solution with cooling until no more precipitation took place. The solid was removed by filtration and recrystallized from hot water and pure p-chlorobenzamidine melting at 155–156° C. in a yield of 42 per cent was obtained.

20 grams of trichloroacetic anhydride was added dropwise under reflux to 5 grams of p-chlorobenzamidine. After the immediate vigorous reaction, the mixture was heated in an oil bath at 120° C. until homogeneous. After cooling, 40 ml. of ethanol were added and the crystalline reaction product was separated by filtration. It was recrystallized from ethanol, purified with charcoal and there were obtained colorless leaflets of pure 2-trichloromethyl-4,6-bis-p-chlorophenyl-1,3,5-triazine melting at 142° C. in 40 per cent yield. Analysis showed 42.31 per cent chlorine and 9.52 per cent nitrogen compared with theoretical values of 42.25 per cent and 10.01 per cent respectively.

The condensation step is further illustrated by the following example: To 160 grams of trichloroacetic anhydride in a 500 milliliter three neck flask fitted with stirrer and reflux condenser was added 40 grams of p-chloro-benzamidine in small portions during about an hour with efficient stirring. A vigorous reaction took place and fumes of $NH_4Cl$ were evolved. When the addition was completed the mixture was heated for half an hour to 120° C. The hot mixture was transferred to a large beaker, cooled to 60° C. and mixed with 300 milliliters of absolute ethanol. After cooling to 0° C., the crystals were filtered off and recrystallized from boiling alcohol with charcoal. The melting point was 142–143° C. and the yield was 31.8 grams (65 per cent of the theoretical).

We claim:

As a new composition, 2-trichloromethyl-4,6-bis-parachlorophenyl-1,3,5-triazine.

CHRISTOPH J. GRUNDMANN.
GERHARD OTTMANN.

No references cited.